US012701030B2

(12) United States Patent
Frost et al.

(10) Patent No.: US 12,701,030 B2
(45) Date of Patent: Aug. 4, 2026

(54) PROTOCOL FOR AUTOCONFIGURATION OF COMMUNICATION NETWORK

(71) Applicant: Melexis Technologies NV, Tessenderlo (BE)

(72) Inventors: Raik Frost, Erfurt (DE); Thomas Freitag, Erfurt (DE); Michael Frey, Erfurt (DE); Heiko Leutert, Erfurt (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 469 days.

(21) Appl. No.: 18/355,759

(22) Filed: Jul. 20, 2023

(65) Prior Publication Data

US 2024/0031200 A1     Jan. 25, 2024

(30) Foreign Application Priority Data

Jul. 25, 2022    (EP) .................................... 22186733

(51) Int. Cl.
H04L 12/40          (2006.01)
G06F 13/42          (2006.01)
(Continued)

(52) U.S. Cl.
CPC .... H04L 12/40078 (2013.01); G06F 13/4247 (2013.01); H04L 12/40 (2013.01);
(Continued)

(58) Field of Classification Search
None
See application file for complete search history.

(56) References Cited

U.S. PATENT DOCUMENTS

2011/0185093 A1*  7/2011  Matsuo ................. H04L 12/403
                                                           710/110
2013/0311691 A1*  11/2013  Barrenscheen ..... H04L 61/5038
                                                           710/110
(Continued)

FOREIGN PATENT DOCUMENTS

EP          1566022 A1      8/2005
EP          3478031 B1      6/2020
(Continued)

OTHER PUBLICATIONS

Extended European Search Report from Corresponding European Patent Application No. EP22186733.6, Jan. 18, 2023.

*Primary Examiner* — Jay L Vogel
(74) *Attorney, Agent, or Firm* — Workman Nydegger

(57)          ABSTRACT

A method for autoconfiguration of a plurality of nodes in a linear network allows extracting the address and position of each node. The method includes applying an identifier field for transmitting to the bus the bit sequence of the identifier of a chosen node. Then for at least for the first node to the last but one node, a field comprising a predetermined bit sequence is applied. The field comprises dominant bits, so a current is transmitted. Then, a further field is applied for transmitting any stored direction bit associated to that node and obtained in any previous iteration. The iteration continues by choosing a node different from a node chosen in any previous cycle, starting the communication, until all nodes are identified.

11 Claims, 5 Drawing Sheets

(51) Int. Cl.

| | | |
|---|---|---|
| *H04L 41/08* | (2022.01) | |
| *H04L 61/5038* | (2022.01) | |
| *H04L 69/00* | (2022.01) | |
| *H05B 47/175* | (2020.01) | |
| *H05B 47/18* | (2020.01) | |

(52) U.S. Cl.
CPC .... *H04L 12/40013* (2013.01); *H04L 41/0886* (2013.01); *H04L 61/5038* (2022.05); *H04L 69/26* (2013.01); *H05B 47/18* (2020.01); *H05B 47/199* (2024.01); *G06F 2213/0052* (2013.01)

(56) References Cited

U.S. PATENT DOCUMENTS

| | | | | |
|---|---|---|---|---|
| 2019/0215100 A1* | 7/2019 | Takahashi | ................. | H04L 1/08 |
| 2019/0294572 A1* | 9/2019 | Rennig | ............ | H04L 12/40013 |
| 2020/0042487 A1* | 2/2020 | Wang | ................. | G06F 13/4291 |
| 2020/0260322 A1* | 8/2020 | Chen | ......................... | H04L 1/16 |

FOREIGN PATENT DOCUMENTS

| | | | | | |
|---|---|---|---|---|---|
| WO | 2005053236 A1 | 6/2005 | | | |
| WO | WO-2013051677 A1 * | 4/2013 | ............ | H04L 25/08 |

* cited by examiner start — S01

Choose node — S02

S03

Apply current on bus if node is any node from the first to at least the last node but one Read current direction through other nodes

S04

Transmit current direction information obtained previously, if any

S05

Perform sorting process

S07

More nodes?          no yes

S08

Determine physical position of each node in the network

| Frame | | Broadcast Header for S2M | | Unique ID | | Current Directions | | Current Measurement Field | |
| M2S Frame | | Broadcast Header for S2M | | | | | | | |
| S2M Frame | | | | Unique ID | | Current Directions | | | |

PROTOCOL FOR AUTOCONFIGURATION OF COMMUNICATION NETWORK

FIELD OF THE INVENTION

The invention relates to the field of communication in a network. More specifically it relates to autoconfiguration of electronic devices connected in a network.

BACKGROUND OF THE INVENTION

In electronic systems, usually a high number of devices need to be controlled. These devices may be actuators, illumination units, etc. The complexity of these systems increases with the number of devices, and the transmission of control signals to each device becomes very difficult. The electronic systems usually form networks and sub-networks which aim to simplify control, e.g., by simplifying wiring and/or securing data transmission against environmental parasitic influences.

The devices are connected to the network as network nodes. Some networks require that the nodes can be identified in order to send them control signals. For example, a master node connected to the rest of the nodes in the network may assign to each node a unique address. This requires a high number of connections or pins per node.

Alternative approaches are possible. It is possible to connect slave nodes with unique available addresses. In this case, the master node collects the unique slave node addresses by arbitration.

However, some applications (such as dynamic light applications in interior lighting systems) require additional information regarding the layout of the devices, not only means to identified and control them.

It would be desirable to provide a network with simple connections and reliable device control, even in a network with a high number of connected devices.

SUMMARY OF THE INVENTION

It is an object of embodiments of the present invention to provide a method of autoconfiguration, a method of communication between electronic devices for autoconfiguration, an electric device for a network and a network which allows extraction of the address of the node and the position in the network relative to other nodes.

In a first aspect, a method of autoconfiguration of a plurality of nodes connected via a bus forming a linear network, each node being identified by an identifier being unique for each node connected to the network a plurality of nodes. The method comprising the steps of choosing a node in a network and extracting its identifier, and at least for the first node to the last but one node, transmitting a current in the network from the chosen node. This allows reading the direction of the current flowing through at least the nodes not chosen in previous iteration cycles. There is advantageously no need to read the value of the current, just the direction. The extracted identifier is linked with the direction of the current for said not chosen nodes, obtaining the position of said not chosen nodes relative to the chosen node. The previous steps by choosing a different node not chosen before, so the newly chosen node is not repeated. The autoconfiguration finishes when the identifier of each node is extracted. The physical position of each node in the network is obtained as the identifier of each node is linked to the direction information to other nodes in the network.

In an aspect, the method can be implemented in a communication frame. The method may comprise interchanging a data frame including a bit sequence between the plurality of nodes, the bit sequence being divided in fields of consecutive bit strings, the method comprising:

applying an identifier field for transmitting to the bus the bit sequence of the identifier of a chosen node, at least for the first node to the last but one node, applying a field comprising a predetermined bit sequence comprising dominant bits for transmitting a current to the bus from the chosen node, allowing reading the direction of the current through at least each remaining node of the plurality that was not previously. The reading may be performed by each remaining node of the plurality. The direction is represented by one of the values of a bit being a direction bit, thus allowing storing a direction bit associated to the position of the reading node relative to the currently chosen node. The method further comprises:

applying a further field for transmitting any stored direction bit associated to that node being the chosen node, and obtained in any previous iteration during which a different node was chosen.

After this frame is sent, e.g., to another node, another node may be chosen, the new node being different from a node chosen in any previous cycle. The cycle is repeated until all nodes of the network are identified.

It is an advantage of embodiments of the present invention that the IDs of the nodes and their relative position within a network are obtained in one single step. It is a further advantage that time required for autoconfiguration is reduced. It is a further advantage that nodes implementing the method may comprise a reduced number of connection pins. It is a further advantage that the method can be coded and executed including bit transmission in electronic devices.

It is noted that collecting the extracted identifier of a node and linking the relative position of the node with respect to previously identified nodes can be done during each iteration cycle, thus sorting the identified node in the network. The identifier of each node is advantageously determined at the end of arbitration, simultaneously with the physical position of the nodes.

In some embodiments, choosing a node (10) further comprises applying each bit of the identifier (ID) of the nodes of the plurality simultaneously into the bus as a field in the communication frame, wherein each bit has the same position in the sequence of bits, and performing arbitration on the bus.

It is an advantage of embodiments of the present invention that the node with the ID having the lowest number is the node which has most dominant bits of the group of nodes considered. Once the node with the lowest number is found, the node is removed from the group and a new cycle allows easily addressing the next node. This advantageously allows an easy and recursive method of addressing each node, since the nodes have unique IDs.

In some embodiments of the present invention, the bus of the linear network is a differential bus, so the signals are applied by differential signaling. In an aspect, interchanging a data frame including a bit sequence comprises interchanging the data frame by differential signaling such the signals applied to CAN networks.

It is an advantage of embodiments of the present invention that electric interferences can be rejected, increasing the safety of the network. It is an advantage of embodiments of the present invention that arbitration is easily applicable to CAN buses, since traditional CAN networks routinely apply arbitration on the messages. The present invention allows identifying nodes while using the well-known arbitration on the node identifiers.

In some embodiments, if there is prior information regarding the number of nodes in the network, the step of transmitting the current is not performed by the node identified as the last node. In some embodiments, such information can be retrieved from the method. In such case, there is no information that after the last node there is no other node, so the last node may also transmit information. Moreover, the rest of the nodes may also collect current direction information (e.g., as direction bits) from the last node, which increases information redundancy and can be used to verify that no mistakes or influence of noise took place.

In some embodiments of the present invention, reading the current through the bus comprises reading the current through a resistor shunting a first bus connection to the node and a second bus connection to the node, where the first bus connection and the second bus connection are connections to the same channel of the bus.

It is an advantage of embodiments of the present invention that the current can be easily measured using simple current sensors, since the absolute value is not necessary.

In some embodiments of the present invention, liking the identifier with the current direction information can be done by storing the direction bit obtained during each iteration cycle linked together with the identifier (ID) of the chosen node which transmits the current in said each iteration. For example, this can be done on the master, and/or in at least another node, e.g., in every node.

It is an advantage of embodiments of the present invention that the nodes can store their relative position with respect to other iteratively chosen nodes. It is an advantage of embodiments of the present invention that one or more slave nodes can be used to store the direction of the current.

In particular embodiments, the method further comprises determining the physical position of each node relative to the rest of nodes connected to the network, based on the stored direction bits obtained from the nodes and linked chosen nodes in each iteration cycle. This can be done in a node, e.g., in the master node, optionally in a plurality of nodes.

It is a further advantage that when the identifier of each node is determined at the end of arbitration, the physical position of the nodes is obtained simultaneously.

In some embodiments, the extracted identifiers and information regarding directions can be stored in one node, such as a master node, or in more than one node.

If the sorting is performed in a plurality of nodes, the method may comprise comparing the physical position obtained by at least two nodes.

It is a further advantage that such information can be used as information redundancy to correct errors introduced by stray currents and/or EM noise.

In some embodiments, the method further comprises broadcasting a header message as sequence of bits for initiating autoconfiguration. This can be done advantageously from a master unit, e.g., a master node, which may receive instructions from a higher-level system.

In particular embodiments, a master node connected to the network bus initiates autoconfiguration by broadcasting the header message in a master-to-slave message frame.

It is an advantage of embodiments of the present invention that master node can start a communication frame for identifying slave nodes, identifying number of slave nodes and their relative position in the linear network.

It is an advantage of embodiments of the present invention that the master does not need to be preprogrammed with the identifiers of the slave nodes.

In some embodiments of the present invention, the direction read in a node during an iteration cycle is stored in that node, for example as a direction bit. In some embodiments, any direction information stored in a given node can be transmitted to the bus when the node becomes the chosen node in an iteration cycle. This can be done by applying a further field for transmitting any stored direction bit(s), by transmitting to the bus any direction bits stored by the node.

In particular embodiments, any stored direction bit is sent within a field with a dynamic size as a part of a slave-to-master communication frame, the size of the field being the number of direction bits transmitted to the bus.

It is an advantage of embodiments of the present invention that communication bandwidth can be kept low.

It is an advantage of embodiments of the present invention that the method can be fully implemented as a communication protocol.

In a further aspect, the present invention provides an electronic device which may function as node connectable to a linear network. The node comprising an identifier (ID), the node being programmed to execute the method of the previous aspect.

The identifier may comprise a bit sequence. In some embodiments, the electronic device is adapted to read the current direction through a shunt resistor (RS) shunting two contacts to the same line of the bus of the network.

It is an advantage of embodiments of the present invention that an electronic device can be provided wherein the number of connections, and thus the number of connection pins, can be reduced compared to other autoaddressing devices.

In some embodiments, the electronic device comprises an integrated circuit as a programmable processing unit. For example, the electronic device may be an integrated circuit including connections e.g., the network, such as pins and the like.

In a further aspect, the present invention provides a linear network comprising a plurality of electronic devices connected as the nodes of the previous aspect of the present invention. In some embodiments, the linear network further comprises a master node. In some embodiments, two or mode nodes of the plurality are configured to determine the physical position relative to the rest of nodes of the network based on stored direction bits, as well as the identifiers of the other nodes which caused the generation of each direction bit. This would allow obtaining the physical position on a plurality of nodes, and comparing the calculated physical position of each node. In some embodiments, when mismatches are detected, the nodes may be adapted to optionally restart the method of autoconfiguration.

It is a further advantage that mismatches introduced by noise can be compensated for by comparison, and corrected by e.g., majority voting, or even restart the autoconfiguration process, e.g., if multiple mismatches are detected.

In some embodiments, the linear network is a differential network.

In a further aspect, the present invention provides a system including the linear network of the previous aspect, further comprising a node for connecting to a high-level system, such as a master node. In some embodiments, the system may be a lighting system for a vehicle, wherein the electronic devices are configured to control lighting units.

Particular and preferred aspects of the invention are set out in the accompanying independent and dependent claims.

Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figures 1, 8:
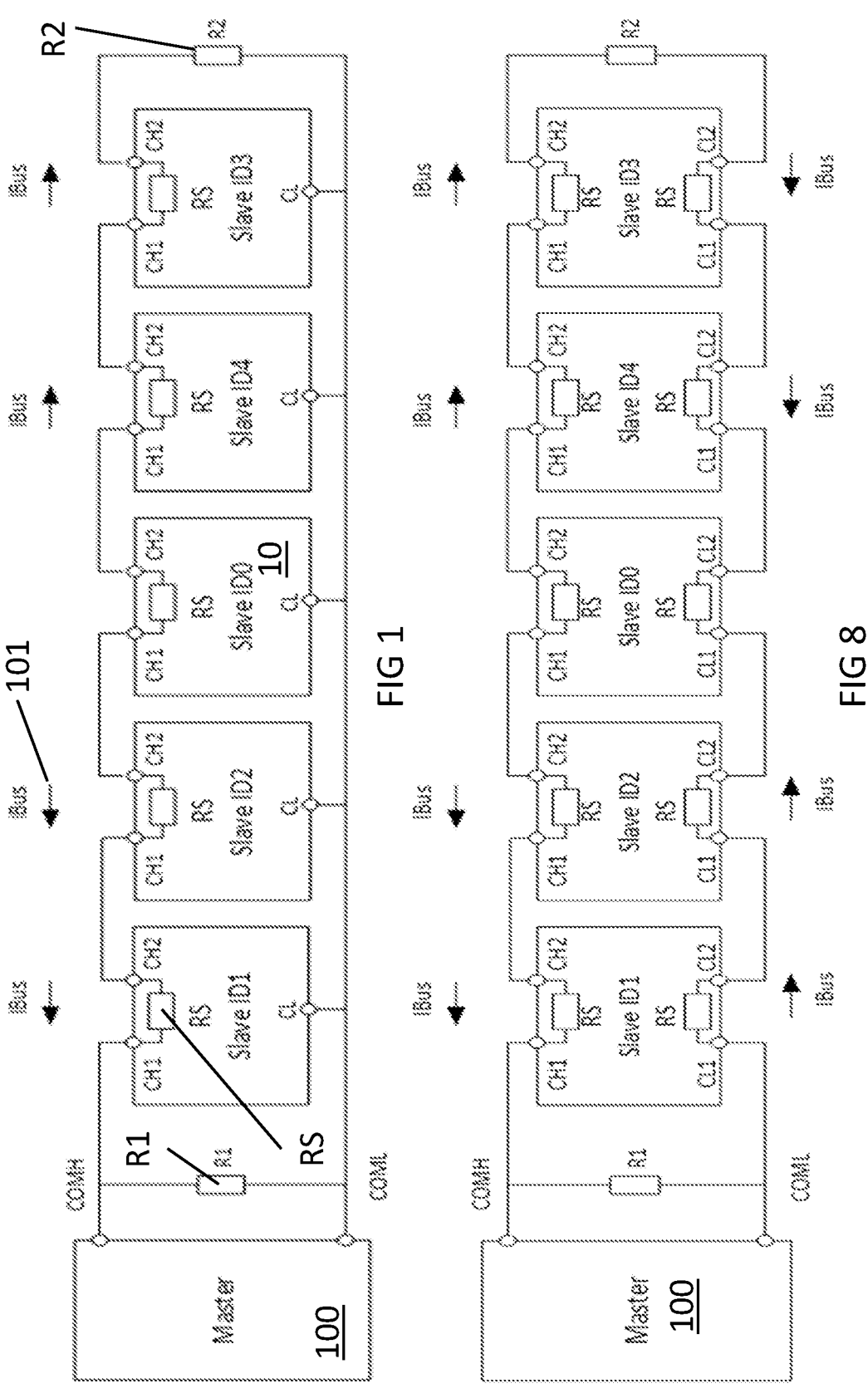
FIG. 1 illustrates a linear network without stubs in accordance with embodiments of the present invention. The network is a differential network including slave nodes with a shunt resistor connected to one of the lines of the network.
FIG. 8 illustrates an alternative linear network without stubs in accordance with embodiments of the present invention. The network is similar to the one in FIG. 1, however the slave nodes include shunt resistors connected to both lines of the network.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Electronic devices connected in a network are known as 'nodes'. A master node or a slave node, in an embodiment of the present invention, may be arranged as integrated circuits (ICs) that comprise certain blocks as e.g., memories, central processing units, PWM modules, controllable current sources, communication interfaces as e.g., transceivers, etc.

Where in embodiments of the present invention reference is made to "linear network", reference is made to a network of nodes forming a single branch, where each node is connected to at most two other nodes. A linear network has no stub nodes or stub networks.

The positioning of the nodes is a relevant issue in for example, lighting systems, e.g., LED lighting strips or any other lighting unit, for interior vehicle lighting, in flap actuators for air regulation of automotive climate systems, etc. Thus, not only a correct identification of the nodes is required, but also a correct physical positioning thereof. The present invention allows the extraction of the node address simultaneously with an indication of the physical position in the network, allowing the network to adapt the transmission of signals to each node taking into account its position in the network. The present invention provides determination of the address of each node and of the physical position of the node with respect to other nodes (or autoconfiguration). As the addresses of all nodes are extracted, the physical position of the nodes in the network can be also obtained. Thus, in some embodiments, the real physical position of the nodes in a network is retrieved simultaneously with the last iteration cycle of determining node addresses. In some embodiments of the present invention, the number of nodes connected to the network is known, so there is no need to add an additional position determination step after determining the addresses of all the nodes. Alternatively, the number of nodes may not be known a priori, and the autoconfiguration may end when no further node transmits any signal as a response to e.g., a broadcast message.

The nodes in the present invention already include a unique address, which may be provided during manufacturing. However, as explained earlier, the address needs to be known in order to be able to control the nodes. Additionally, when the topology of the network is an important factor to take into account, both the address and the topology need to be established in order to properly control the devices. In fact, the topology of the network may be a constraining factor during installation. The addresses already included in the nodes need to be somehow linked to the topology of the network. Thus, there is the issue of extracting the addresses from the nodes, and there is the separate issue of providing the position in the network of each node. Extracting the addresses can be done by prompting the nodes to transmit their addresses to the network bus to which they are connected. For example, this can be done by arbitration. The nodes of the network can therefore be identified by their unique address, but the address of each node does not need to be known a priori.

It has been found that, during autoconfiguration, the nodes transmit signals in the network to which all other nodes are connected. The signals can be directional signals (e.g., a current), so the rest of the nodes could extract directional information from that signal, which gives information of the position of the nodes. The present invention allows a simple way of extracting the address simultaneously with position information. Thus, the network can be installed with the nodes in a required topology, without having to take into account the particular address of each node. Each node can therefore be identified, by the end of the process, the positioning of the identified nodes can be established.

The particular autoconfiguration scheme in the present invention allows a cyclic procedure in which a unique node is chosen from an established plurality, based on a predetermined condition. The chosen node is configured to emit a directional signal, such as a current. In particular embodiments, the directional signal is sent as a current for a predetermined time period. The chosen node becomes a source. The current flows through the bus and the connected nodes to e.g. termination resistors. Nodes connected on one side of the chosen node will receive the current flowing in one direction, while nodes connected on the other side of the chosen node in the linear network will receive the current flowing in the other direction. The direction of the current can be easily obtained. Thus, it is possible to obtain which nodes are connected to the bus branching from the chosen node towards one direction, if any, and which nodes are connected to the bus branching from the chosen node towards the other direction, if any.

The network in the present invention is a linear network, with no stubs or branching in a third direction, so each node can be connected to at most two other nodes and their relative position is unambiguous. Since only information of the current is needed, the invention is advantageously simple.

The following iteration requires choosing a different node, discarding nodes that were chosen in previous iterations. Once identified, the newly chosen node becomes a current source. Again, the direction of the current through the remaining nodes is established. Although it is possible, it is not required to establish the direction through each of the other nodes, only through the remaining nodes, thus excluding the nodes that were chosen in previous iterations. The present invention allows a fast process since the plurality of nodes to take into account diminishes with each cycle, reducing data management.

At the end of the procedure, the address of each node is established, together with complete information of the position of the nodes relative to each other. In other words, when the address of each node (and indication of current directions) is determined, all current directions can be combined with the addresses to obtain real, physical, positions of each slave.

While in the following, embodiments of the present invention will be explained with reference to a differential network, it is noted that the present invention can be adapted to other linear networks.

In a first aspect, the present invention provides a method of autoconfiguration. The method comprises choosing a single node in a linear network, providing a current from that node and enabling the rest of the nodes to measure the current direction in relation to the node providing the current. The cycle is repeated by choosing a different single node which has not been chosen before. It is not necessary to collect the direction of the current through each node in each cycle, since the nodes chosen in previous cycles can be disregarded.

Figure 2:
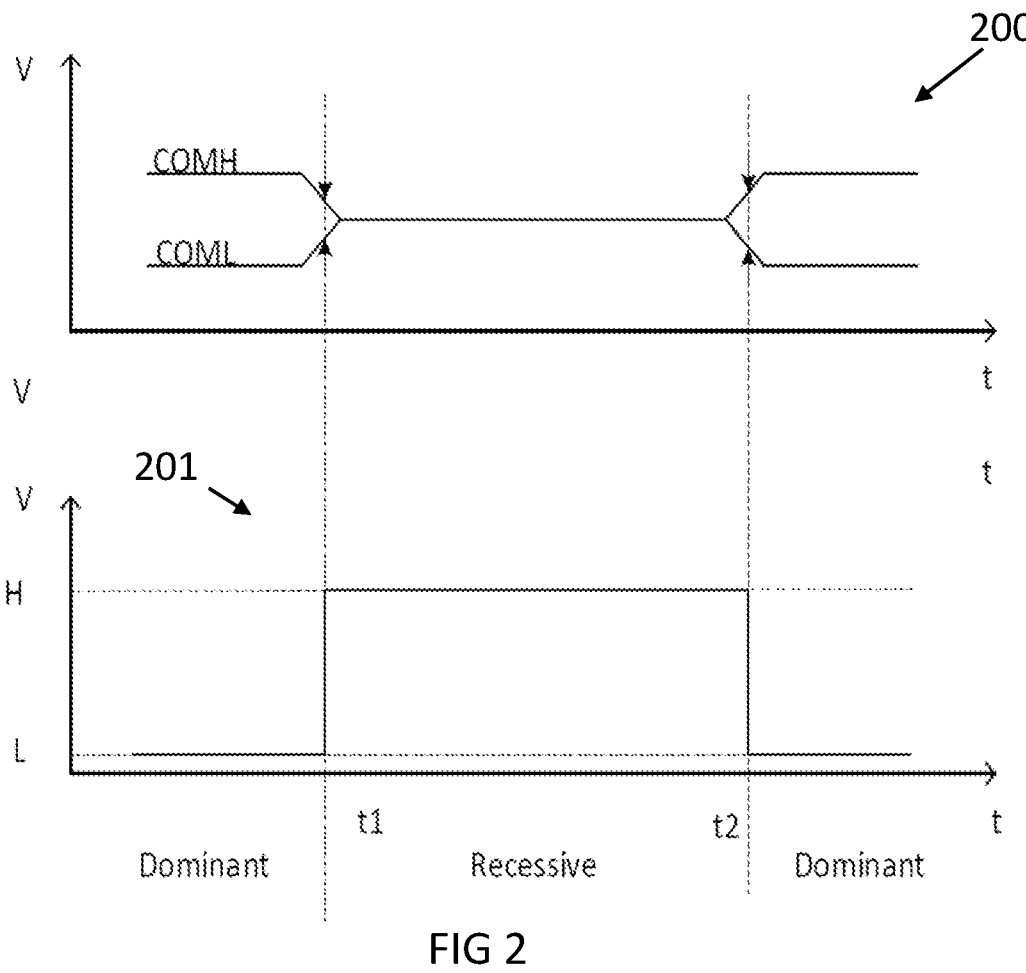
FIG. 2 illustrates two graphs, a top graph showing the different voltage levels in each communication line for different states of information in a differential bus with two channels. The lower graph shows the dominant and recessive states of the differential bus caused by the voltage levels shown in the top graph.

An exemplary network is shown in FIG. 1, including five slave nodes 10 in a linear network, without stubs, and a master node 100. The master node may be a master control unit or the like, for example it may be the unit which requires and requests the unique identifiers of the (slave) nodes. The master node may have slave functionalities, so it may also have an identifier on its own and be programmed to execute the method, e.g., in accordance with a protocol, and also react to signals broadcast by itself. The network is a differential network, which is advantageously insensitive to electromagnetic noise compared to other networks, thanks to the presence of the differential 'high' and 'low' communication lines (COMH, COML respectively). In a differential network such as a CAN network, each network member can provide dominant or recessive information on the bus, see the top graph 200 of FIG. 2 showing the different voltage levels in each communication line for different states of information. A dominant state is a logic zero (L) and a recessive state is a logic 1 (H) as shown in the lower graph 201 of FIG. 2. In differential signaling, a dominant state is characterized in that a voltage difference between the network lines COMH and COML is applied by a given network member. If such a dominant state is put on the bus, then a current will flow over the bus termination resistors R1, R2 (see e.g., FIG. 1). If the state is a recessive state, no active voltage is brought by a the node to the bus, so that the bus might settle to e.g., a voltage of approximately half of the bus supply voltage, e.g. 2.5V for a differential network as e.g., a CAN network. This voltage might be in the middle of a differential voltage window for a dominant state.

Further each slave node might comprise means to detect a directional signal (such as a current) through the slave node. For example, each slave node may include, connected to one of the communication lines (COMH or COML) a shunt resistor RS, as it is also shown in FIG. 1 as well. The direction of the current 101 through the bus (IBus) can be read though this resistor RS. The resistor may be chosen to have a very small resistance, so their influence in the network can be neglected. This will be discussed below.

In the particular example of FIG. 1, slave node ID0 may put a dominant state on the bus, thus a current will flow away from slave node ID0 towards the termination resistor R1 and towards the termination resistor R2. The linear network arrangement has no stubs, so the current through the shunt resistors of Slave ID2 and Slave ID1 will flow to the left direction towards R1 and the current through the shunt resistors of Slave ID4 and Slave ID3 will flow away from Slave ID0 in the right direction towards the termination resistor R2.

Each slave node has an ID which can be transmitted to the bus as a sequence of bits, however the ID of each node and its position is not known a priori. This invention allows obtaining the address or identifier of a node, which then may send a current through the bus. The relative position of the rest of nodes can be obtained with respect to the identified node, by reading the direction of the current. The current may be sent as a field in the communication frame, as a sequence with a predetermined number of dominant bits. Since this can be repeated for each node, the present invention allows obtaining this ID and positional information.

In some embodiments, the autoconfiguration is triggered by the broadcasting of a signal for triggering the process. The broadcast may be done by the master node 100 connected to the network. In this case, the nodes of the network which are required to be identified and positioned are the slave nodes 10. Thus, during autoconfiguration, the master node determines the unique network addresses of all slave nodes and their physical location in the network.

For that purpose, in a first step, an address determination process is performed, which results in the extraction of an identifier of a node and in the relative positions of the rest of the nodes with respect to the identified node. In a single step, the unique node address is determined by arbitration as well as an indication of its physical position. The information of the physical position is obtained by transmission of a directional signal through the bus from the chosen node, so the position of the rest of nodes in the network relative to the chosen (transmitting) node can be obtained. The transmission of a directional signal (current) may be done as part of the procedure of determining addresses, e.g., during the arbitration procedure. In other words, when a node transmits its ID during arbitration, if the node puts a dominant state on the bus, all other network members can be in a recessive state as they are not able to provide any additional information. And if they are in a recessive state, they are not driving the bus. The current will pass through all the shunt resistors of these nodes. And when the current is passing through a shunt resistor, such a node in recessive state can detect a current direction to the left or to the right. This effect can be utilized by configuring the nodes so, as a node in the plurality is chosen by determining its address, the node emits a predetermined current, for instance by transmitting a plurality of dominant bits. The number of bits is predetermined, so the rest of nodes can read the current direction. Suppose a network extends linearly so a direction can be defined from right to left, the nodes being connected to different points of the network. Each reading node, upon reading the direction of the current, can obtain information relating to their own relative position with respect to the chosen node emitting the current, either at the left of the chosen node if the current flows towards the left through the reading node, or at the right, if the current flows towards the right in the linear network.

Emitting this current as a sequence of bits allows implementing the method in a communication frame, instead of working with a value of current for signals and another value for positioning. Additionally, even nodes with addresses ending in recessive bits (ending in 1) do emit a current for the other nodes to read and obtain position information. The information of the direction (left or right) can be represented (and stored) as one information bit, or 'direction bit'.

At the end of arbitration, each node has been identified, which also means that each node from the first to at least the last but one has transmitted a current, allowing collection of information regarding the relative position of the nodes with respect to each other. The nodes that detected a current direction, associated to a chosen node, can share this information with at least another node (e.g., a master node). A given node shares the information when that given node is chosen (aside from the first node, which did not detect any current). All the information of the relative currents and the identity of each node can be combined, so the physical position of each node in the network is obtained. FIG. 1 shows the relationship between positioning of the nodes in the network relative to the chosen node and measurement of the current direction.

The current 101 through the bus is shown in FIG. 1 as flowing from the first chosen node, in this case ID0. The direction of the current can be read from the rest of the nodes. This is done successively for all slave nodes in the network until all unique addresses have been determined by the master node.

Figure 3:
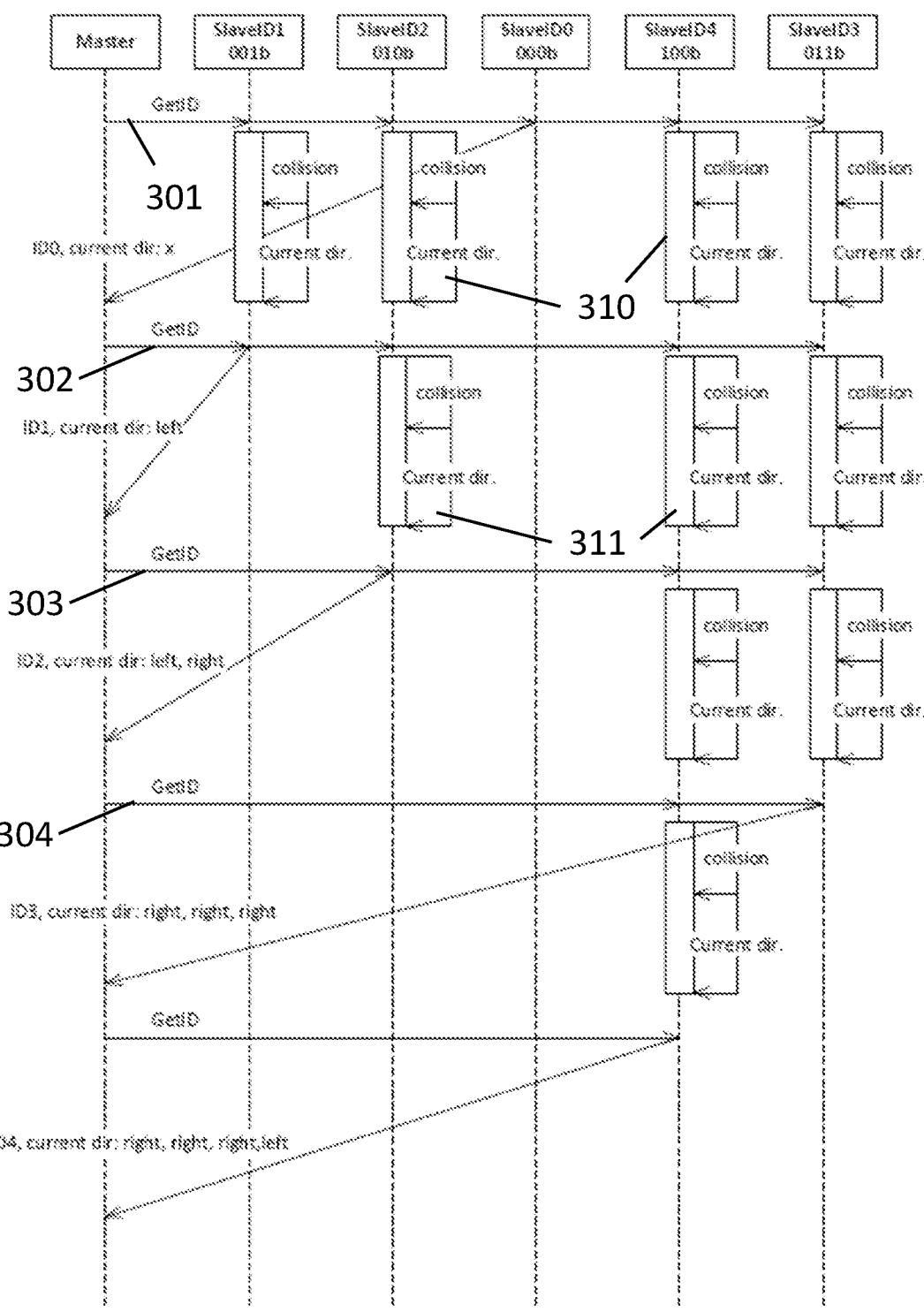
FIG. 3 shows a schematic address determination process in accordance with embodiments of the present invention. Each horizontal line shows an iteration cycle for arbitration, and the nodes that detect collision switch to a 'current direction sensing' mode.

FIG. 3 shows a schematic address determination process in accordance with embodiments of the present invention. In the first cycle of the address determination process, the first address of a slave node connected to the network is determined under use of arbitration, as follows. After broadcasting information from the master node to the slave nodes ('GetID', first line 301), all the slave nodes will put, bit by bit, in a time-synchronous way, their ID on the bus. All slave nodes will do that at simultaneously a given bit of the sequence.

In FIG. 3 the slaves carry the following binary unique IDs from left to right (from Bit 2 to Bit 0) as shown in the Table I:

TABLE I

| Node identifiers | | | |
|---|---|---|---|
| | Bit 2 | Bit 1 | Bit 0 |
| ID1 | 0 | 0 | 1 |
| ID2 | 0 | 1 | 0 |
| ID0 | 0 | 0 | 0 |
| ID4 | 1 | 0 | 0 |
| ID3 | 0 | 1 | 1 |

Hence, upon receiving the broadcasting signal from the master node, all slave nodes put Bit 2 on the bus.

Only nodes ID1, ID2, ID0, ID3 might further be considered during arbitration, since they put a dominant state (bit 0) on the bus. The first bit, or Bit 2, in the ID of node ID4 is recessive (Bit 2=1), so the recessive state generates a state of collision in the cycle, since the other nodes take over the bus with their dominant states. Node ID4 will not continue arbitration in that cycle anymore and might switch to a current direction measurement state, in order to measure the current direction between CH1 and CH2, thus the connections with the bus line. This will be determined after the master node has identified the chosen slave node address after the arbitration process.

Then all the slaves node will further put in a synchronous manner Bit 1 in the bus. Only slaves ID1, ID0, will further continue arbitration. Nodes ID2, ID3 detect collision since they both have recessive bits in that position of their ID, so they will switch into a current direction measurement state and will not continue arbitration in that cycle. Node ID4 is already in that mode. After that, the slave nodes that are still participating in that arbitration will put Bit 0 on the bus. As before, node ID1 will detect collision since the bit is recessive, and will switch into the current direction measurement state. Node ID0 'wins' the arbitration since it was able to put Bit 2=0, Bit 1=0 and Bit 0=0 as a dominant state on the bus.

This means, the master is able to detect that a network member (node ID0) with a unique address 000 is connected on the bus.

This 1st arbitration cycle itself is finished, the unique address ID has been determined, and in some embodiments the ID is stored by the master node. The identified slave node may be instructed or preferably configured to put a current direction information as successive bit sequence on the bus for all slaves, that have been determined by the master in previous cycles. Since this cycle was the first, node ID0 does not transmit information of the current direction as the information is not available. In terms of bus protocol, the node transmits a field with null size. In practice, the information of the current direction (e.g., direction bits) are sent if available, thus are send from the second cycle, when the second node is chosen.

Next, for example in a following field of the bus protocol, the identified node will put the bus for a given time in a dominant state. A current flows from the node that has been identified in the present arbitration cycle, to allow measuring the current direction, relative to said identified node, through the nodes of the network, including at least the nodes not identified in previous cycles. The measurement can be done in the nodes themselves, e.g., using sensing elements included or integrated in the node.

Hence, the direction of the current 101 Ibus in FIG. 1 can be to the left direction (thus from e.g., CH2 to CH1), or to the right direction (thus from e.g., CH1 to CH2). The result can be memorized as a single bit of information. The result can be stored in each node, e.g., it can temporarily be stored. In one embodiment of the invention, each slave node might additionally store the ID of the node that has been identified during this arbitration cycle.

FIG. 3 shows that during arbitration, all slave nodes that 'lost' arbitration are indicated with a 'collision' graph 310, and switched to measure the current direction. The chosen node ID0 then sets the bus in a dominant state so the rest of the nodes can measure the current. The chosen node ID0 also transmits its identifier ID as a bit sequence to the master node (and, in some embodiments, all the rest of slave nodes can store it, too); in particular this can be done during arbitration. Since this is the first cycle 301, the first chosen node did not measure any current, so there is no information regarding the current direction. Then the next arbitration cycle starts.

In a 2nd arbitration cycle, the master node may broadcast again a header, so that all non-identified slave nodes put their unique address as the sequence of bits forming their ID on the bus, as before. Since the node ID0 is already identified, said node ID0 will not participate anymore. This is shown in FIG. 3 by the lack of arrow termination on the second line 302 for node ID0. The rest of nodes, or participating nodes, put Bit 2 on the bus. Only slave nodes ID1, ID2, ID3 will further be considered, as they take the bus via their dominant state bits 0, see the Table I. Slave node ID4 will not take part in this arbitration cycle and switches in current direction measurement mode as it only has a recessive bit 1 and detected a collision 311 towards the dominant state of slave nodes ID1, ID2 and ID3.

Then the remaining participating slaves put Bit 1 on the bus. Only slave node ID1 will continue to arbitrate. Slave nodes ID2 and ID3 switch to current direction measurement as indicated by the 'collision' graph 311, as they detected a collision of their recessive bit states compared to the dominant state of slave node ID1. Then all participating slave nodes, in this case the remaining node ID1, will put Bit 0 on the bus, which is recessive in this case.

Slave node ID1 is then identified, and it transmits any current direction bit obtained in previous cycles successively on the bus. As only slave ID0 was identified until now, slave ID1 puts a bit information on the bus, that is equivalent for "left" as a current direction. In some embodiments, other nodes, such as the master node, collects the address and the direction bits from ID1:

left: for slave ID0 in dominant state.

This is a clear information that this bit is linked to a current direction for slave node ID0, since ID0 has been identified in a previous cycle.

Figure 4:
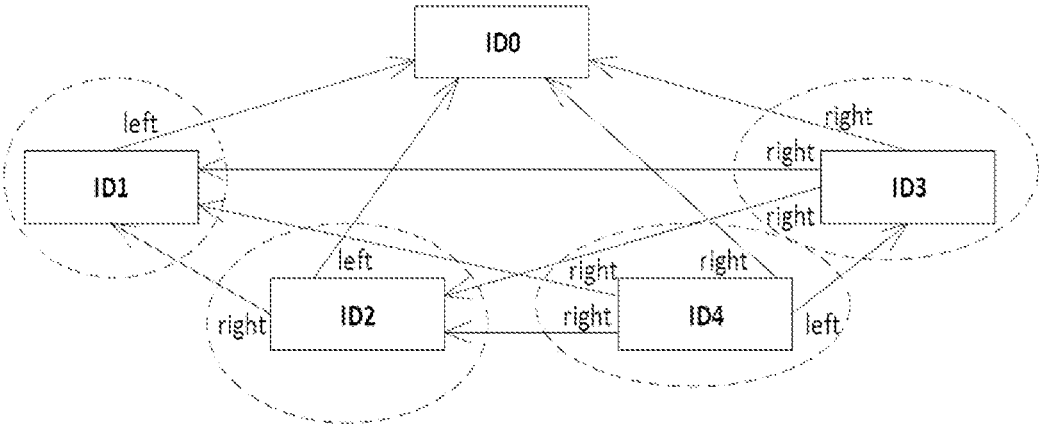
FIG. 4 shows a schematic position diagram in the form of a binary tree, representing the sorting process and how it is used to determine the physical position of the nodes in the network.

It is possible to build up now a table or a binary tree as shown in FIG. 4 with the following information which can be memorized in a successive manner:

Identified slave,

Current directions measured previously,

Unique slave IDs to what each current direction belongs.

A node, e.g., a master node, may collect and identify all this information. The processing of the position of the nodes may already start.

The identified node again puts the bus in a dominant state. The current directions are measured in the rest of slave nodes.

In a particular embodiment of the invention, the current direction is not measured through the node(s) chosen in previous iterative arbitration cycles. In this case, the handling of slave node ID0 as already identified slave node is finished at the end of the iteration in which said node was identified.

This is not the only possibility. In another embodiment of the invention, the current direction is measured through the rest of nodes of the network including any previously identified slave node or nodes, as in this case slave node ID0. The measurement and storage of the result may be executed by the node itself, as before. Each of the detected current directions are stored as single direction bit of information. They can be stored in the master node and on at least one further slave, e.g., in the other slave nodes. The identified unique address can also be stored in the master node for that arbitration cycle, and optionally in other slave nodes. In some embodiments, for example each identified slave node will create a table with measured current directions and identified unique addresses. The derived information can be memorized by each slave node. This table may be continued until all slave nodes have been identified by the master node. These tables, available at all the slave nodes, might be used later on as information redundancy, for example in applications that require high safety.

Returning to the address determination process, as shown in FIG. 3, the master node triggers again an arbitration cycle, the third cycle, by sending again a broadcasting message requesting the slave nodes to put their IDs on the bus. Slave nodes ID0, ID1 have already been identified so they are not taken into account. This is shown in FIG. 3 by the lack of arrow termination on the third line 303 for nodes ID1 and ID0.

Slave nodes ID2 and ID3 have dominant states for Bit 2 and will continue arbitration. Slave node ID4 switches to current direction measurement mode, as it has a recessive state and detects a collision of the dominant sates of slave nodes ID2 and ID3. Then Bit 1 is put on the bus, for both slave nodes ID2 and ID3 this is a recessive state, no collision is detected. Then Bit 0 is put on the bus, slave node ID3 detects a collision and switches to a current direction measurement state. Slave node ID2 is identified by the master node as unique ID address for the network. Afterwards, the chosen slave node transmits direction bits in a successive manner on the bus indicating the current direction relative to the previously identified slave ID1 and slave ID0.

A bit indicating left current stored when the slave ID0 set the bus in dominant state.

A bit indicating right current: for slave ID1 in dominant state.

The 1st transmitted bit might match the current direction transmitted from the 1st identified slave ID0 (left), the 2nd transmitted bit to the 2nd identified slave node ID1 (right direction of the current, since the newly chosen node ID2 is positioned at the right side of node ID1). This is also shown in FIG. 3. In other words, the chosen node ID2 detected a current to the left when node ID0 set the bus in a dominant state, and to the right when node ID1 set the bus in a dominant state, so the node ID2 must be positioned on the right of ID1 and on the left of ID0.

The master node (and/or one or more slave nodes) might collect this information and memorize it accordingly, as previously explained.

The last identified slave node might put the bus again to a dominant state, so that (at least) the still non identified network members can perform a current direction measurement of the current transmitted by slave node ID2.

In the previous arbitration cycles, slave nodes ID0, ID1, ID2 have been identified by their unique IDs in the connected network. This means that, in a 4th arbitration cycle as shown in the fourth line 304 of FIG. 3 after the broadcasting message in the bus, the previously chosen nodes are skipped, and arrows terminate only on the remaining slave nodes ID3 and ID4. These nodes will put Bit 2 on the bus. Slave node ID4 detects a collision and switches to the current direction mode. Bit 1 and Bit0 are then put sequentially in the bus, both being recessive. With that, slave node ID3 is identified by the master.

Node ID3 transmits the current directions, for example as direction bits, on the bus, in the same way as previously discussed. Node ID3 has measured the following current directions for the following slaves:

right: detected for slave ID0 in dominant state
   right: for slave ID1 in dominant state
   right: for slave ID2 in dominant state The chosen node also sets the bus in a dominant state, and the direction of the current through the rest of the nodes is measured. This is done in at least the rest of the nodes that previously 'lost' arbitration, in this case ID4, however in other embodiments it can be done in the rest of the nodes including the previously identified nodes as already explained.

In a 5th arbitration cycle the master node puts again a broadcasting message on the bus and the remaining members will put again Bit 2, Bit, 1, Bit 0 on the bus in a successive manner. Since slave nodes ID3, ID2, ID1, ID0 have already been identified and no other participants are available, Slave node ID4 put all the bits of its ID and will be identified by the master to be part of the network. Slave node ID4 will put the previous measured current directions on the network similar as explained:

right: for slave ID0 in dominant state
   right: for slave ID1 in dominant state
   right: for slave ID2 in dominant state
   left: for slave ID3 in dominant state In some embodiments, the last identified node may also put the bus in dominant state for a predetermined time, while the current through the rest of slave nodes is obtained. However, this is optional, since no more slaves will be chosen in a further iteration cycle and in some cases, no more direction bits may be sent. For example, the slave nodes might include a counter and they may be pre-programmed with the maximum number of slave nodes in the network. Thus, the nodes can count how many slaves are identified and indeed the last identified slave might skip the current measurement field. Upon identifying the last node, the node may send any direction bit stored therein, and the process may stop without sending the measurement current. The measurement current field may have a size of 0 bits. Thus, the current may only be sent by the first identified node and by any node except in the last iteration cycle. In other words, if the node is not the last node, the node always puts the bus in dominant state for a predetermined time. If the node is the last node of the network, the node may not put the bus in dominant state, thus finishing the process. Same is valid for a master node. Also the master node might have a counter implemented and is pre-programed with the maximum number of slave nodes in a network. Also the master node might count the number of identified slaves. If a last slave is identified, the master might not send any broadcasting message anymore to the connected slave nodes for starting a new arbitration cycle.

However in some embodiments, the last node may put the bus in dominant state for the predetermined time although it takes that additional time to set the sequence of dominant bits. This is the case if the number of nodes is not known or not programmed a priori. The autoconfiguration process takes slightly more time, but there is advantageously no need of implementing prior information of the network, improving flexibility. Additionally, the rest of nodes may also measure their current and store the result, allowing comparison between tables of different nodes (or between sortings made by different nodes) for detecting inconsistencies.

If there were more slave nodes, for example nodes ID5, ID6, the master node might further continue the test. A slave with ID7 being 111b might not be part of the network since the ID includes only recessive states and would be omitted. This may be the case if a priori there is no information regarding the number of nodes attached to the network, to ensure that the arbitration yields one valid address. In some embodiments, the master node might use such a code in order to detect that there is no additional network member anymore and the arbitration can be stopped with a presence of a code including only recessive states (e.g., 111b) during the address determination process.

Other stop conditions for the address determination process might also be defined as part of a protocol. For example, the master node (and slave nodes) may be pre-programmed with information regarding the number of nodes present in the network, and a counter may count the number of iteration cycles and thus the number of chosen nodes, allowing finishing the process when the counter reaches the number of nodes in the network. In this case, a bit sequence with only recessive bits may be used as a valid address, so one more address is available for a given size of ID field in a protocol.

Figure 5:
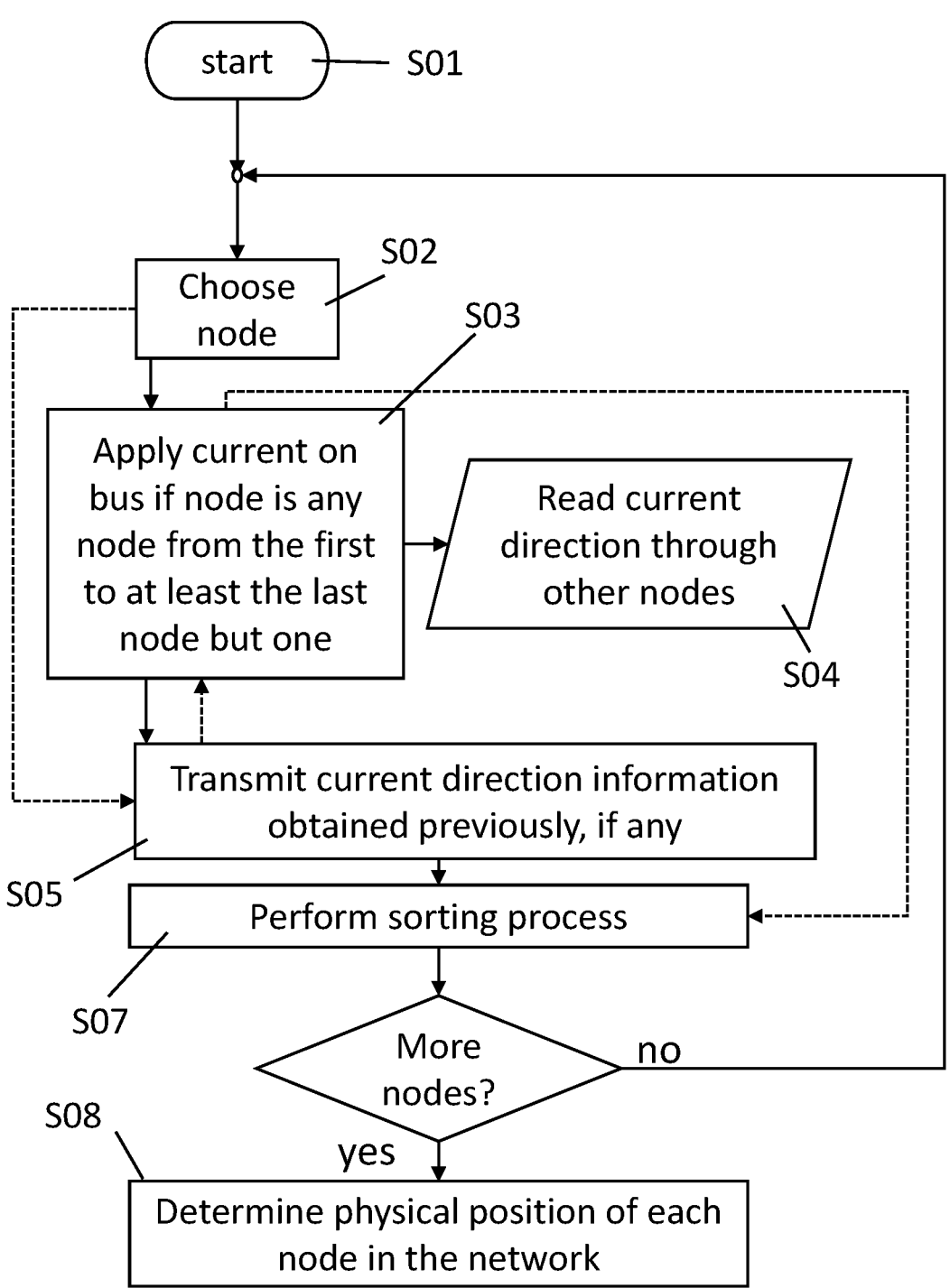
FIG. 5 shows a schematic diagram of the method for autoconfiguration in accordance with embodiments of the present invention.

A schematic diagram of the method is shown in FIG. 5. The process first starts S01 by means of a signal in the network, in some embodiments including broadcasting a header, e.g., by one of the nodes, e.g., the master node. The first node is chosen S02, for example by arbitration. This may include applying an identifier field for transmitting to the bus the bit sequence of the identifier (ID) of a chosen node. The first node then applies S03 a current on the bus, e.g., by applying a known sequence of dominant bits (e.g., applying a series of ones). The rest of nodes in the network read S04 the current direction flowing through the bus at the node position. For example, each remaining node of the network may read the current direction, other than the chosen node (since the chosen node transmits the current). For example, each node of the network, except for the chosen node and any node previously chosen, may read S04 the current direction. Previously chosen nodes will not be chosen again so in principle they do not need to transmit anymore direction bits, so they do not need to collect them either. However, they may still collect direction bits for later processing of positioning data and information redundancy, allowing detecting a possible error. In any case, the identifier of the chosen node is linked to the information of the direction of the current in the rest of the nodes, giving an indication of the position of the unchosen nodes relative to the chosen node. Obtaining this information can be done by processing the information, either in one node (e.g., master node) or in several nodes. Preferably, this can be done while determining the identifiers of the nodes. In order to perform the processing, the nodes need to store the information and share it with at least the master node. This is done for each node when that node is chosen, for example by sending or transmitting S05 the obtained direction bit or bits. This means that the first node does not have any direction bit stored, so it can be considered that the first node applies a current direction field with a null size, or it can be considered that the step of transmitting S05 current direction information is skipped in the first iteration cycle (since it did not obtain previously any direction bit), i.e. transmitting S05 the information is done for all nodes but the first chosen node. Then, a new cycle starts as long as there are unidentified nodes in the network. This can be done by again broadcasting a header, triggering identification of the nodes, e.g., by arbitration. A further node is in any case chosen S02. The second node applies S03 a current on the bus, allowing the rest of nodes to read the current direction again. After or before this step, the node also transmits S05 any previous information direction, e.g., direction bit or bits, obtained in previous iterations. It is noted that the step of applying S03 current can be performed after or before transmitting S05 current direction information. In any case, the node receiving the current direction information (e.g., the master node, or other nodes) is capable of linking each received direction bit with the each previously chosen node which sent the current that generated that direction bit. This can be done by using registers. Hence, the last chosen node will send the direction bit caused by each and every previously chosen node. This node may transmit a measuring current, for example if there is no information of how many nodes are connected to the network. In this case, if other nodes are 'listening', then the nodes can obtain a complete table with relative position of each node.

The master as well as the slaves may be pre-programmed with the information regarding many nodes are connected to the network. A counter implemented in the nodes may count the identified slaves. This allows to use also an ID with only recessive states (e.g., 111b) if required. Additionally, the last identified slave may not put the bus in a dominant state during the current measurement field since all the nodes are informed that every node is identified.

When the address determination process is finished, the following information is available:

it is known how many members (nodes) are connected to the network, their unique network addresses, and a position indication for each slave node related to positions of other slave nodes This information allows determining S08 the physical position of each node in the network, e.g., by calculation. As mentioned earlier, the master node may receive and process this information. Additionally, other slave node or nodes in the network may also receive and process the information. Since the process is iterative, the node collecting the information (one of the nodes of the network, which may be for example a master node) might perform S07 the sorting process during the address determination process, e.g., during arbitration and current measurement cycle. This is not the only possibility, and in some embodiments of the present invention the sorting may be performed S07 after all slave node addresses are determined, so during the iteration cycles the information (address bits and direction bits) is stored only.

The address sorting process, which transforms the indication of physical position indications into physical positions for all slaves in the network, will be explained in the following, also with reference to FIG. 4. The node or nodes collecting the information, e.g., a master node, may apply a tree-search algorithm in order to determine the exact position of each slave node. The sorting can be carried out by linking the direction bit read through each remaining node with the identifier of the chosen node which caused the current in each iteration cycle, so as to establish the position of each remaining node relative to the chosen node.

First, node ID0 is identified. The next identified slave node was slave ID1, it is positioned to the left of slave node ID0. This information is obtained because the node ID1 sends the direction bit obtained in the previous cycle, the value of which indicates that a current flowing to the left was read at the position of the node ID1 (since that current was transmitted by the previously identified node ID0). However, at that stage of the address sorting process it not known how many possible more nodes might be positioned between slave node ID0 and slave node ID1, or even if there is any.

Next, slave node ID2 was identified. The transmitted current directions reveal that it is positioned right from slave node ID but left from slave node ID0. The direction bits are stored in e.g., registers, so it is known which direction bit was caused by which chosen node. For example, they may be transmitted in the same sequence as they were generated. Next, slave node ID3 was identified. The transmitted current directions indicate that it is positioned right from slave node ID2, right from slave node ID and right from slave node ID0.

Finally, slave node ID4 is identified. The transmitted current directions indicate that it is positioned to the left of slave node ID3, to the right of slave node ID2, to the right of slave node ID and to the right of slave node ID0.

The address sorting process delivers a final order equivalent to the physical location of the nodes in the network, namely ID1, ID2, ID0, ID4, ID3. This string represents the position of the nodes in the linear network.

It should be noted that the relation is from one slave node to the other. The relation with respect to the master node is disregarded. In some embodiments, the master node might be arranged left from node ID1 or right from node ID3 or even in the middle of such a linear network. It could be connected to any position in the network. In some embodiments, the master node is not considered one of the nodes for autoconfiguration. However, the relative position of master node may also be obtained as explained below.

The process of autoconfiguration, being iterative as explained before, allows performing the sorting during the steps of determining the addresses and measuring current. Once the current direction information (e.g., the direction bits) are sent by an identified slave, they can be collected and derive a physical position, updating the position in the position diagram shown in FIG. 4. Thus, when all the nodes are identified, e.g., when arbitration finishes, the position of each node is simultaneously available, and the network autoconfiguration is complete after a single address determination process. These calculations are made by the processor of a node, e.g., a master node, or on more than one node.

Doing the sorting at the same time as the address determination is a preferred embodiment, since the calculations can be made during arbitration, for example by nodes which have been already identified, reducing idle time. However, the process of sorting can be done after determining the addresses of the nodes.

FIG. 4 shows that the number of transmitted direction bits increases with the number of identified slave nodes. If the bus protocol would be chosen in a way that the number of bits for the current direction field are flexible (e.g., in a field with dynamic size), it allows a lower bus load and thus requesting a lower bandwidth.

It is noted that the position of the master node can be also obtained, especially if the master node has slave function in the network. The master node aside of its master function (broadcasting signals, etc.) may also obtain its relative position with other nodes (e.g., obtain direction bits), by reading the current direction every time a node transmits the current (e.g., as a predetermined number of dominant bits 0 in a 'current measurement field') and storing the information also in a table, for introducing the information in the position diagram of FIG. 4.

Previously it was mentioned that identified slave nodes do not need to measure current directions when succeeding nodes are identified and set the bus in dominant state. In those embodiments wherein an identified node sets the bus in dominant states and every remaining node, including previously identified nodes, measure the current direction, each slave node builds up a table that contains the measured current directions and the slave ID source of the current for which the directions were measured. This table can be build up and memorized by each slave. In the particular embodiment wherein the position of the master node is relevant, it may also transmit current and its own direction bits to the rest of the nodes, if the rest of nodes are also configured to provide sorting and positioning.

Thus, more than one node can perform, at the end of the address determination process or more preferably during the address determination process as explained before, also an address sorting process. After address determination process, the following information is available at multiple nodes, e.g., at each node:

how many slaves are in the network which are the unique network addresses of the slaves what is the physical position of each slave in the network.

This shows that the method could be in principle applied in the format of slave-to-slave (S2S) frame, in principle with no involvement of a master node. The master node may be included to trigger the process, but other systems could be used for that.

In embodiments of the present invention including a master node, the master node executes the address sorting process, since in principle the master node has received all the required information in previous steps. For redundancy and security reasons, the master node might ask one or more slaves nodes to transmit the result of their own address sorting process to the master node. The tables of the slave nodes are more comprehensive and contain also redundant data. For example slave node ID2 has a current direction of slave node ID1 available, while slave node ID1 has been identified and puts the bus in a dominant state in order to allow the other slaves to measure current directions related to the position of ID1.

In the same way, the current direction related for the position of node ID2 is available to the slave node ID1 (e.g., the slave node ID1 may store this information).

The master node may compare the results of the address sorting process between the result of the master node and the results of one or more slave nodes, in order to check for mismatches. Such mismatches might be possible, if some slave nodes have performed a wrong measurement (because of e.g., electromagnetic disturbances). If a mismatch has been detected, e.g., a majority voting might be performed in order to determine a final result. If several mismatches have been detected, the master node might also decide to restart the autoconfiguration process again. This might be initiated by another broadcasting message, and all slave nodes need to skip the history and need to start again from scratch. It can be seen that there is an advantage from a security point of view.

The method can be implemented in a communication protocol. The method may include transmission of a bit sequence through a bus between the slave nodes, optionally between a master node and the slave nodes. The bit sequence may form a communication frame divided in fields. The fields include bit sequences including information interchanged by the different nodes. In particular, the present invention may include transmitting a field with the direction bits from a chosen slave node. In some embodiments the chosen slave is the winner of an arbitration on the IDs of the slave nodes. Each direction bit is generated as a result of a current measurement from previously chosen slave nodes. In some embodiments of the present invention, the bit sequence may include transmission of a predetermined number of dominant bits (in other words, transmission of a current for a duration equal to the transmission time of a predetermined number of bits) from the chosen node.

Figures 6, 7:
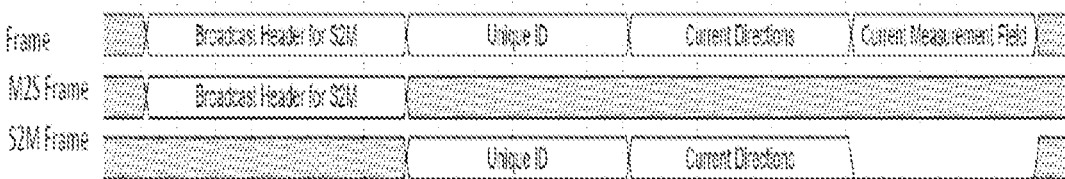
FIG. 6 shows an exemplary communication frame specifying the protocol. The top frame shows the communication frame in the bus. The middle frame shows the master-to-slave frame, applied on the bus by a master node. The lower frame shows the responses from the slave nodes, as a slave-to-master frame.
FIG. 7 shows an exemplary electronic device in accordance with embodiments of the present invention, for a linear differential network.

FIG. 6 shows an exemplary communication frame specifying the protocol.

The protocol frame might comprise a broadcast information (header) to be used as a master-to-slave (M2S) frame. The header triggers each iteration cycle of the address determination process As before explained, in some embodiments, the iteration cycle may be an arbitration cycle.

The protocol frame includes an ID field. The chosen node, which may be identified by e.g., arbitration, sends its unique ID in this field. The size of the ID field may have n bits, wherein n depends on the number of bits forming the ID. The ID field is sent in a slave-to-master (S2M) frame.

In this exemplary embodiment, the present invention not being limited thereto, the nodes have each a unique address identified by 3-bit addresses. Considering the particular address 111b as a pure recessive state of at the bus, it might not be used as a valid slave ID. Thus, in the present embodiment, a maximum 7 slave IDs are allowed (000b, 001b, 010b, 011b, 100b, 101b, 110b). In the foregoing discussion, five nodes are attached to the network (ID0, . . . ID4). In case of an n bit addressing space, and in the case of identification by arbitration, $2\exp(n)-1$ arbitration cycles are needed, since the master node does not know a priori how many slave nodes are connected, nor if the unique IDs are coded in a linear way with no interruptions in a linear address space. However, as mentioned earlier, if the nodes are pre-programmed with the number of nodes in the network, an address with only recessive bits (as 111b) may be available to a node.

The protocol frame and in particular the S2M frame (at the bottom of FIG. 6) may further comprise a 'current directions' field, wherein bits representative of current directions are transmitted to the bus. These direction bits may be obtained in previous cycles as explained earlier, wherein the measurement and storing may be done in the node itself. At the moment a given node is identified, the slave node transmits this information. For example, in some embodiments, the 'current directions' field follows the ID field. In some embodiments, the size of the field is dynamic:

For the 1st identified slave the field is of zero size,
For the 2nd identified slave the field is 1 bit wide,
For the 3rd identified slave the field is 2 bit wide,
. . . and so on. This has an advantage that the bus bandwidth can be kept low which in many applications is required for electromagnetic compatibility.

In another embodiment the field is foreseen with a static nature. For a n bit addressing space, in some embodiments, it might have a size of $2\exp(n)-2$ bits or $2\exp(n)-1$ bits for the current indications (corresponding to $2\exp(n)$ except for the first chosen node, for which there are no previous measurement during the first iteration cycle, and for the particular address with only recessive bits if the address is not available). This size is determined by the number of current directions, that a last slave might need to provide to the master. Unused bits during a given arbitration cycle might not be interpreted by the master node.

The protocol frame and in specific the S2M frame further might comprise a current measurement field. In this field, for a given arbitration cycle, the identified slave node will put the bus over a given time (several bit times) to a dominant state, in order to enable the current direction measurements of the rest of, at least, non-identified slaves. This can be done advantageously fast. For example, in the case of 2 MBit/s bandwidth of the bus, the bit time is 0.5 us. The transmission of the current measurement field might take between 0.5 us-10 us depending on the hardware for measuring the current direction (comparator, ADC or others).

After all arbitration cycles needed to identify all nodes, the unique IDs of all slave nodes (as well as a position indication for each slave node related to positions of other slave nodes) are available for at least the master node. In some embodiments, the particular address with only recessive bits may not be used, so there is no arbitration cycle for that address. This means that the number of cycles may be, at most, $2\exp(n)-1$. The physical position in the network can be determined for each node for example during arbitration.

It is noted that FIG. 6 shows a communication frame where the 'Current Directions' field is followed by the sequence forming the 'Current Measurement Field'. However, these two fields can be exchanged. In such case, the last identified node puts the bus in a dominant state for a specified time (in the 'Current Measurement Field'), in order to enable other nodes to measure the current directions. Then said last identified node releases the bus and transmits the measured and stored current directions as the sequence of direction bits forming the 'Current Directions' field. In embodiments of the present invention wherein the 'Current Directions' field has dynamic size, the field increases in each cycle. In that case the nodes can synchronize their current direction measurements to a fixed position in the bus protocol, in specific to the dominant state of the last identified node.

More in detail, a method of communication following the protocol explained in the foregoing, it is possible to use fields with fixed size for each iteration cycle. The timing is the same for all nodes that need to measure the currents after the current direction field.

However, it is also possible to use a dynamic field size. The current measurement field includes a predetermined number of dominant bits, so the current direction field may have a dynamic size. In this case, the nodes cannot anticipate, a priori, how long the field will be. They may count how many nodes have already been identified in order to be able to interpret the signals in the bus whether they are part of the current measurement field or not (in other words, in order to 'anticipate' when the current measurement field starts. The counting can be carried out with a counter, for example. An easier implementation would be to implement the current measurement field, which has a fixed size, before the current direction fields with variable field. This means that nodes can synchronized the moment they start measuring current to the 'unique ID' field and the 'current measurement' field, since both of these have fixed size. So, after the bit sequence of both fields ends, all relevant nodes can start measuring the current, since the chosen node starts transmitting the current to the bus during the 'current measurement' field. Afterwards, the 'current direction' field starts, which can be variable and finish when all direction bits are transmitted. This allows the message frame to be shorter in early iterations, improving autoconfiguration speed, rather than having a message frame of fixed size which is easy to implement but each iteration cycle takes longer.

In another aspect, the present invention relates to an electronic device configured to perform, when connected to a network, the steps of the method. The electronic device can be also referred to as node, particularly when the electronic device is connected to a network. The electronic device may be for example an IC including connections. The electronic device includes an identifier (ID) that can be output to the bus of the network. As a node in a network, the device has a unique address compared to any other (slave) nodes of the network. The node is configured to provide the ID to the network bus, for example if prompted to by an external signal, e.g., a broadcasting signal from another node such as a master node. The node is also configured to measure the current direction through the bus. For example, the node may be configured to switch to a current direction measurement upon detecting collision. The result of the current direction measurement may be taken into account, and stored, only if the current lasts for a predetermined amount of time, which can be equal to the 'current measurement field'. Further, the node is configured to provide, if present, any stored information regarding current direction measurements that had been previously made. The node is configured, additionally, to drive the bus to a dominant state for a predetermined amount of time. In some embodiments, the electronic device may be configured to receive current direction information and/or IDs from other devices in the network. In some embodiments, the electronic device may be programmed to process the current direction information and/or IDs from the other devices and obtain a sequence of IDs representative of the relative physical position, in the network, of the nodes having said IDs.

The transmission of information may be done bit by bit. For example, the node may be configured to transmit its address a bit sequence, bit by bit, of a predetermined number of bits to the network bus. The information regarding the current direction may be also transmitted as a direction bit, wherein one value of the bit represents one direction, and the other value represents the opposite direction in the network. Driving the bus to a dominant state may be done by sending a sequence of dominant bits for a predetermined number of bits. The node may be configured to communicate via a protocol of communication as explained before.

FIG. 7 shows an exemplary electronic device 10 in accordance with embodiments of the present invention. The electronic device may comprise an integrated circuit IC and connections to bus lines, in this case differential bus lines CH, CL. In particular, the connections may be adapted to provide means for measuring current direction through the line. In this case, there are two connections CH1, CH2 to one and the same bus line, and a single connection to the other bus line CL, the present invention not being limited thereto. The electronic device may be a slave node. It may include control units for controlling, for example, actuators, LEDs, etc.

More in detail, a communication interface comprising a differential physical layer 19 and a bit protocol processing unit 18 is connected to the differential bus lines CH1 and CL. The communication interface handles the previously described protocol, including receiving and transmitting of data as well as enabling current direction measurements of the slaves. In particular, the electronic device may comprise means for measuring current direction. In the exemplary device shown in FIG. 7, the means include a shunt resistor. In particular, CH1 serves as an input pin for a bus line of the slave 10 and is connected to one terminal of the shunt resistor 20. The shunt resistor 20 is connected with its other terminal to CH2, which serves as an output pin for the same bus line of slave 10. A voltage drop over the shunt resistor 20 can be measured with e.g. a comparator 21. This provides a single bit information if the voltage drop is positive or negative, which is equivalent to a current direction from CH1 to CH2 or from CH2 to CH1. This information is delivered to a microcontroller 13. The microcontroller 13 also uses the received data from the bit protocol processing unit 18, or provides data to it. Instead of a comparator, an Analog-to-Digital-Converter (ADC) might be used to detect the voltage drop over the shunt resistor and thus the current direction. Any other suitable means can be used.

The unique ID of the node may be available in e.g., a NV data memory 16 as for instance an EEPROM or a Random Access Memory (RAM) or just a set of registers. During the address determination process, this unique IDs (from any node connected to the network) can be retrieved, for example may be collected by a master node. In some embodiments, the slave node stores under use of e.g., a Central Processing Unit 14 the measured current directions in the NV data memory 16.

In one embodiment, the electronic device 10 also stores the unique IDs of the another slaves, that are related to the measured current directions.

In one embodiment the CPU 14 of the slaves is programmed to execute the address sorting process as previously explained and store the result in the NV data memory 16.

The slave might further comprise blocks as e.g., voltage regulator 11, oscillator 12, that will provide supply voltages and clocks to the mentioned blocks.

The slave might also comprise functional blocks as e.g., pulse width modulation blocks 22 and adjustable current sources 23 in order to control e.g., light sources as for instance LEDs, in an application, the present invention not being limited thereto.

A master node may be programmed to calculate the relative position of the nodes based on their IDs and the gathered information from measuring the direction of the currents through the nodes. The master node may include similar hardware, so the electronic devices connected to a network may be homogeneous. However, application related blocks might be missing or might be different.

In some embodiments, the master node is able to perform the previously described method. This means that the master node also has an ID, which is transmitted through the node, and the master also measures the current through the bus and transmits the current directions.

The master node may behave also as an electronic device with the same functionalities as a slave node, however with additional functionalities as a master node. In some embodiments, the slave nodes and also the master node may have electronic units connected so that the node can control and drive them. These may be e.g., LEDs. In some embodiments, the master node may have a communication interface to the connected slaves and another communication interface to a higher level system.

In that case, the master node has a master function, being a gateway function from the higher level system to the connected slaves, including controlling all connected slaves and their functionality (e.g., lighting). However, since the master node also is configured to control electronic units and is connected to them (e.g., LEDs), the master node has also a slave function. And in that case also the master has an ID and a physical position, that needs to be figured out in the same way as for all connected slaves.

This also means that the autoconfiguration (address and physical position determination) will be done for all the slaves nodes by the master node as the master functionality, inclusive the slave function of the master node.

In a further aspect, the present invention provides a linear network connecting electronic devices in accordance with the previous aspect of the present invention.

The linear network is exemplified as a differential network including a master node and multiple slave nodes, for example more than two slave nodes, interconnected by a bidirectional bus, as e.g., a CAN bus or also proprietary buses. An example of bus for a network in accordance with embodiments of the present invention is disclosed in e.g. document EP3478031B1.

The unique identity of each node may be an identifier (ID) such as a unique sequence of bits. The nodes might have received their ID as a production step during manufacturing. Such a unique identity could for instance be a code in an electrically programmable memory as e.g., an EEPROM. Such a code could for instance comprise a lot number of a wafer batch of the IC of the node, the wafer number, the position of the integrated circuit on that wafer . . . . Alternatively, the node may receive a unique code, provided only once per node.

In principle the ID could be any information that would make the node unique in a network.

Such a code might be programmed into an EEPROM for instance during a test step at the end of the manufacturing process in which the integrated circuit is tested according to its specification.

This unique ID might serve directly as address information. It might have a size of e.g., 32 bit allowing $2^{32}$ unique IDs. It can also be of less bits depending on a production volume over time for a given integrated circuit. The ID must just be unique for the network in which the IC will be used.

For the method this is not important how long this ID is, because in typical networks in vehicles such as cars, e.g., in a network for interior lighting or climate ventilations, only around 256 members need to be interconnected.

Further, it can be considered an exemplary network arranged in a linear way without stubs with one master and five slaves, as shown in FIG. 1. The network might also comprise 2 termination resistors. For a CAN network the termination resistors R1 and R2 at each end of the network are specified with typical 120 Ohms leading to a total impedance of 60 Ohm for the network as both resistors can be seen in a parallel connection.

Further, each slave node may comprise, connected to one of the communication lines (COMH or COML), a shunt resistor RS as it is also shown in FIG. 1 as well and in more detail in FIG. 7. This shunt resistor might be of a very small value as for instance 50 mOhm or 100 mOhm or 200 mOhm. If for instance in a network 100 members are interconnected and each shunt resistor is of 50 mOhm each, an additional resistance in one of the communication lines of 5 Ohm would come on top. This value is still within the specification limit for a termination resistor, since the specification requires a value between 100 Ohm and 130 Ohm (typically 120 Ohm). This means, as well, that the influence of such a small shunt resistor can be neglected compared to the overall network termination.

Other solutions, for example solutions including autoaddressing by a daisy-chain configuration, require additional contacts. The present invention provides a solution with a small number of contact pins. These may include pins for Supply, Ground (not shown in FIG. 1) CH1, CH2, CL, one less than a differential network with an Autoaddressing/Autoconfiguration feature via daisy chain connections.

Detection of the current direction in such networks might be possible in an easy way with a type of comparator or analogue to digital converter (ADC), as the following calculations will show for e.g., a 50 mOhm shunt in accordance with FIG. 1.

The voltage difference on a differential network in a dominant state might be e.g., 2V. The current may be obtained since 2V/60 Ohm termination results in a total current of approximately 30 mA. This current can be divided by 2 as the current flows away from the slave in a dominant state in the direction of R1 and R2 in a nearly equal way.

This means, that slaves in a recessive state have a voltage drop over the shunt resistor of 50 mOhm*15 mA=0.75 mV. This voltage drop will be of a positive sign for one current direction and of a negative sign for the opposite voltage direction, which can be represented in one bit, e.g., 0=left direction, 1=right direction.

It is only important to detect the current direction, it is not important what is the absolute value of the current. This simplifies the needed hardware. Known offset compensation methods can be applied to the comparator.

However, due to the shunt resistors, the differential network lines are not exactly symmetric. For a bandwidth of about 100 kbit/s–1 Mbit/s this might not be a problem, but for a higher bandwidth above 500 kbit/s to 2 Mbit/s there may be adverse effects. In order to improve symmetry, shunt resistors in both the COMH and COML line might need to be present as shown in FIG. 8.

If a network is arranged in accordance with the embodiment shown in FIG. 8, it is only needed for a given slave to detect a voltage drop over one of the shunt resistors in the communication line COMH or COML. The 2nd shunt resistor has only been added for symmetry reasons in case of a higher bandwidth communication in differential networks.

The invention claimed is:

1. A method of autoconfiguration of a plurality of nodes connected via a bus forming a linear network, each node being identified by an identifier comprising an identifier bit sequence, the identifier being unique for each node connected to the linear network, the method comprising interchanging, in each iteration cycle, a data frame including a frame bit sequence between the plurality of nodes, the frame bit sequence being divided in fields of consecutive bit strings, the iteration cycle comprising:

applying an identifier field for transmitting to the bus the identifier bit sequence of the identifier of a chosen node, at least for the first node to the last but one node, applying a field comprising a predetermined bit sequence comprising dominant bits for transmitting a current to the bus from the chosen node, allowing reading a direction of the current through at least each remaining node of the plurality that was not previously chosen, wherein the reading is performed by said remaining node, the direction being represented by a value of a bit being a direction bit, thus allowing storing a direction bit associated to a position of the chosen node relative to said at least each node that was not previously chosen, applying a further field for transmitting any stored direction bit associated to that node and obtained in any previous iteration, performing a further iteration cycle of the three previous steps by choosing a node different from a node chosen in any previous cycle, and starting again a communication, until all nodes of the linear network are identified, further comprising storing the direction bit obtained during each iteration cycle linked together with the identifier of the chosen node which transmits the current in said each iteration, further comprising determining a physical position of each node relative to the rest of nodes connected to the linear network, based on the stored direction bits obtained from the nodes and linked chosen nodes in each iteration cycle, wherein determining the physical position is performed by a plurality of nodes, further comprising comparing the physical position obtained by at least two nodes.

2. The method of claim 1 wherein choosing a node further comprises applying each bit of the identifier of the nodes of the plurality simultaneously into the bus as a field in the data frame, wherein each bit has the same position in the respective identifier bit sequence, and performing arbitration on the bus.

3. The method of claim 1 wherein the method is an autoconfiguration of a plurality of nodes connected via a bus, the bus being a differential bus, wherein interchanging a data frame including a frame bit sequence comprises interchanging the data frame by differential signaling.

4. The method of claim 1 wherein reading the current through the bus comprises reading the current through a resistor shunting a first bus connection to the node and a second bus connection to the node, where the first bus connection and the second bus connection are connections to a same channel of the bus.

5. The method of claim 1 further comprising broadcasting a header message as sequence of bits for initiating autoconfiguration.

6. The method of claim 5 wherein a master node connected to the network bus initiates autoconfiguration by broadcasting the header message in a master-to-slave message frame.

7. The method of claim 1 wherein the direction read in a node during an iteration cycle is stored as a direction bit in that node, wherein applying a further field for transmitting any stored direction bit further comprises transmitting any stored direction bit by the node to the bus when the node becomes the chosen node in an iteration cycle.

8. The method of claim 7 wherein any stored direction bit is sent within a field with a dynamic size as a part of a slave-to-master communication frame, the size of the field being a number of direction bits transmitted to the bus.

9. A node connectable to a linear network, the node comprising an identifier, the node being programmed to execute the method of claim 1, wherein the current is read through a shunt resistor shunting two contacts to a same line of the bus of the linear network, wherein two or more nodes of the plurality are configured to execute the method and compare the determined physical position of each node in order to detect mismatches and restart the method of autoconfiguration.

10. The node of claim 9 further comprising an integrated circuit as a programmable processing unit.

11. The linear network of claim 9, wherein the linear network is a differential network.

\* \* \* \* \*